Aug. 21, 1934.    J. A. DESNOYERS    1,971,174
ADJUSTABLE HEADLIGHT FOR MOTOR VEHICLES
Filed Sept. 3, 1931
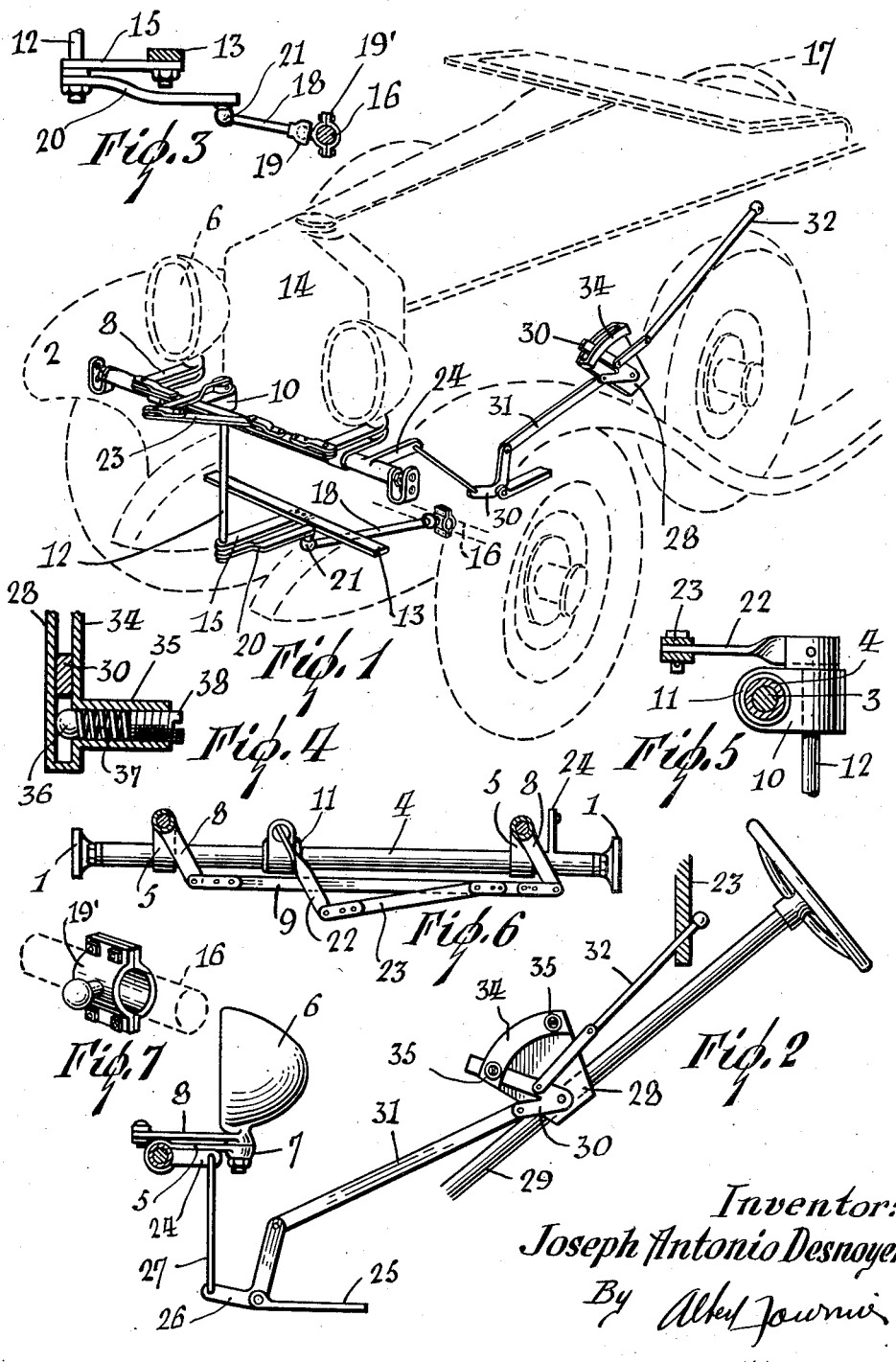
Inventor:
Joseph Antonio Desnoyers
By Albert Journé
Attorney Patented Aug. 21, 1934

1,971,174

UNITED STATES PATENT OFFICE

1,971,174

ADJUSTABLE HEADLIGHT FOR MOTOR VEHICLES

Joseph Antonio Desnoyers, Coderre, Saskatchewan, Canada

Application September 3, 1931, Serial No. 561,009

2 Claims. (Cl. 240—61.5)

The present invention pertains to a novel means for adjusting the headlights of motor vehicles.

The objects of the invention are, first, to provide means whereby the lights turn sidewise as the front wheels are steered and, second, to provide manual means for tilting the lights vertically to produce a dimmer effect. The effect of the automatic lateral swinging of the lights is obviously that the path is lighted as the vehicle turns a corner, while ordinarily the light is thrown where not needed in making a turn.

The dimmer effect, produced by tilting the lights downwardly, differs from present dimming action in that it is not accompanied by a decrease in the intensity of the light. This is especially important when the battery is weak. The dimming is a substantial safety factor in that the glaring of light into the eyes of approaching drivers is thereby avoided, thus eliminating a major cause of accidents.

The invention is fully disclosed by way of example in the following description and in the accompanying drawing in which Figure 1 is a perspective view showing the device applied to a motor vehicle;

Figure 2 is a side elevation of the device;

Figure 3 is a detail thereof;

Figure 4 is a detail section;

Figure 5 is a detail vertical section;

Figure 6 is a plan section; and

Figure 7 is a detail view of the collar fixed to the radius rod.

Reference to these views will now be made by use of like characters which are employed to designate corresponding parts throughout.

Figures 1 and 6 show a pair of brackets 1 secured to the front fenders 2 of a motor vehicle. Between the brackets is secured a fixed shaft 3 surrounded by a rotatable tubular shaft 4 held against sliding. The shaft 4 has a pair of brackets 5 extending rearwardly therefrom, and on these brackets are head lamps 6, pivotally mounted as at 7. Arms 8 extend horizontally forward from the lamps and are joined together by a link 9 articulated thereto.

On the shaft 4 is loosely mounted a bracket 10 permitting rotation of the shaft therein but sliding with the shaft by reason of rings 11 fixed to the shaft and engaging the ends of the bracket. This bracket serves as the journal for one end of a vertical, depending shaft 12. A strip 13 is secured beneath the radiator 14 and has fixed thereto a forwardly extending arm 15 which journals the lower end of the shaft 12.

The usual radius or tie rod which deflects the wheels on turning the steering wheel 17 has a forwardly extending rod 18 attached thereto by a universal joint 19 and collar 19'. A lever 20 is secured to the lower end of the shaft 12, extending rearwardly therefrom, and joins the forward end of the rod 18 at another universal joint 21. An arm 22 extends fixedly from the upper end of the shaft 12 and joins a link 23 which in turn is connected to the link 9.

Thus, when the rod 16 is shifted by operation of the steering wheel 17, the shaft 12 is turned on its vertical axis, swinging the arms 22 and 8, and turning the lamps 6 on their pivotal mountings 7. It will also be seen that this action is entirely automatic and that the lamps turn in the same direction as the forward wheels, so that the light is thrown in the direction of turning, simultaneous with the turning rather than subsequently thereto.

A finger 24 is fixed to the tubular shaft 4 near one end thereof, and a bracket 25 is secured on the adjacent front fender 2. This bracket serves as the pivotal mounting for a bell crank lever 26 which has its forward arm connected to the finger 24 by a link 27. A plate 28 is secured on the steering post 29 and carries another bell crank lever 30 which has one of its arms joined by a link 31 to the remaining arm of the member 26. An operating rod 32 extends from the lever 30 through the dash board 33 for swinging the finger 24 and shaft 4 and thereby rocking the lamps vertically. When the lamps are directed downward, they project a comparatively short distance, thus serving the purpose of dimmers, but without loss of light intensity, which is especially important when the battery is weak.

The plate 28 carries a guide piece 34 behind which an end of the lever 30 moves as shown in Figures 2 and 4. Bosses 35 are formed near the ends of this piece and receive steel balls 36 urged towards the plate 28 by springs 37. The springs are backed and adjusted by studs 38 threaded in the bosses. The spring-pressed balls serve as detents for holding the lever 30 against vibration in positions determining the downward and upward direction of the lamps, so that these adjustments are unaffected by vibration.

Although a specific embodiment of the invention has been illustrated and described, it will be understood that various alterations in the details of construction may be made without departing from the scope of the invention as indicated by the appended claims.

What I claim is:—

1. Automatic adjusting means for headlights comprising a shaft adapted to be supported across the front of a motor vehicle, a pair of brackets extending horizontally from said shaft, headlights pivotally mounted on said brackets, arms extending from said headlights, a link connecting said arms, a vertically journalled shaft connected to said link for sliding the latter, and linkage adapted for connection to the tie rod of the vehicle, for turning the last named shaft and turning said headlights.

2. Automatic adjusting means for headlights comprising a shaft adapted to be supported rotatably across the front of a motor vehicle, a pair of brackets extending horizontally from said shaft, headlights pivotally mounted on said brackets, arms extending from said headlights, a link connecting said arms, and linkage adapted for connection to the tie rod of the vehicle, for shifting said link and turning said headlights, and means for turning the rotatable shaft to tilt said brackets and headlights in vertical planes.

JOSEPH ANTONIO DESNOYERS.